UNITED STATES PATENT OFFICE.

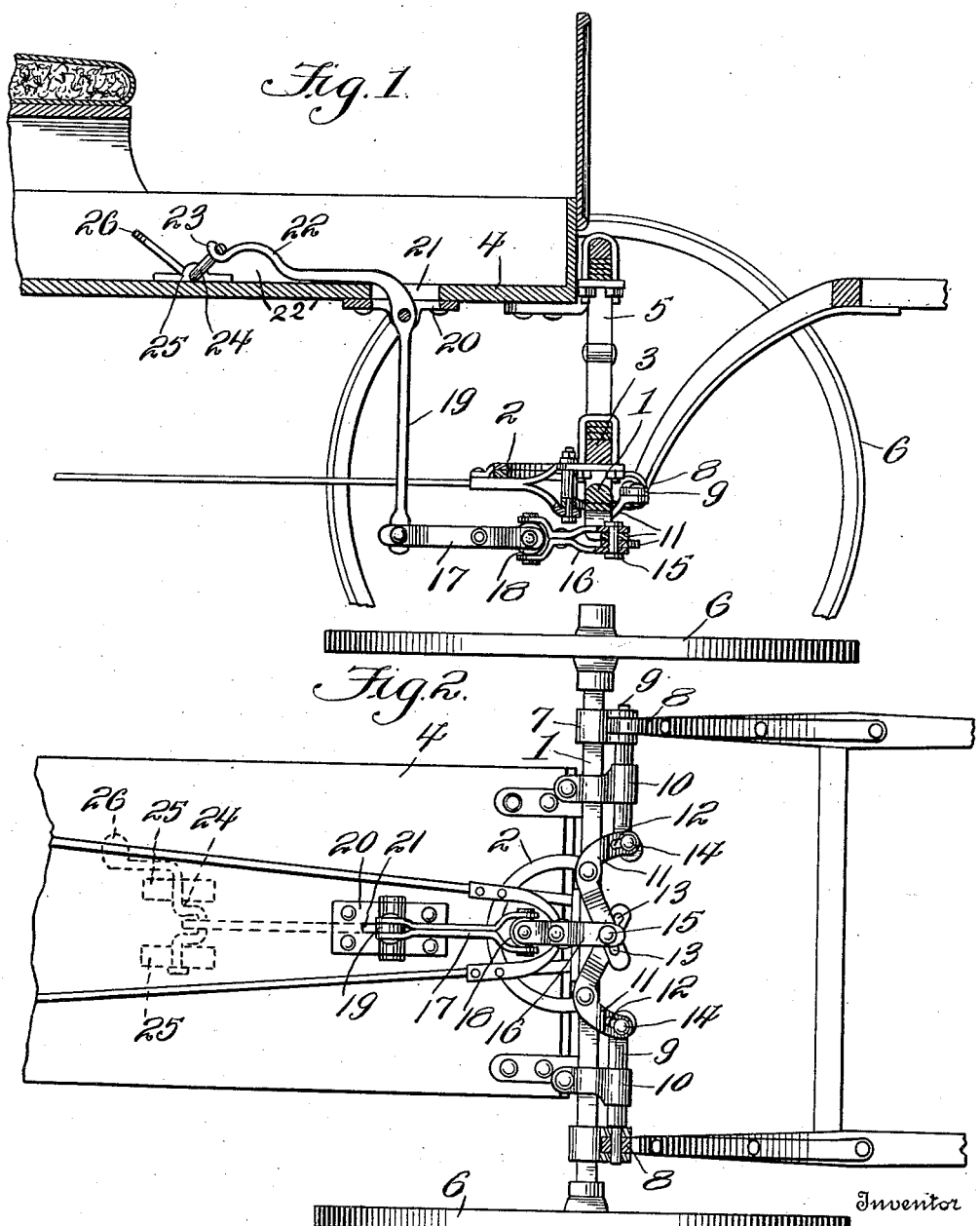

CHARLES B. SMITH, OF TERRA ALTA, WEST VIRGINIA.

HORSE-DETACHER.

1,074,476.

Specification of Letters Patent.

Patented Sept. 30, 1913.

Application filed August 26, 1911. Serial No. 646,151.

*To all whom it may concern:*

Be it known that I, CHARLES B. SMITH, a citizen of the United States, residing at Terra Alta, in the county of Preston and State of West Virginia, have invented new and useful Improvements in Horse-Detachers, of which the following is a specification.

This invention relates to horse detachers and the object of the invention is the provision of a device of this character wherein the parts are few and simple and may be cheaply and effectively installed on buggies or any other body vehicles.

Further objects of the invention will appear as the following specific description is read in connection with the accompanying drawing which forms a part of this application, and in which:—

Figure 1 is a longitudinal section through a portion of the vehicle showing my device attached thereto. Fig. 2 is a bottom plan view.

Referring more particularly to the drawing, 1 represents the front axle to which is connected, by means of the fifth wheel 2, the usual bolster 3 which supports the body 4 through the springs 5. The axle has secured thereto, adjacent the supporting wheels 6, suitable bifurcated thill lugs 7. These lugs are adapted to receive the thill ends 8 and are apertured to receive the locking bolts 9 which are slidably mounted in the bearing brackets 10 also carried upon the axle.

Pivoted to the axle, on opposite sides of the center thereof, are two bell crank levers 11 which are slotted in each end, as shown at 12 and 13, the slot 12 adapted to receive a stud 14 which is carried upon the inner end of each bolt 9. The slot 13 of each bell crank lever 11 is engaged by a bolt 15 which passes through the levers and through the bifurcated end of a connecting link 16 which is connected to a similar link 17 by a universal joint 18. The inner end of the link 17 is pivotally connected to the depending arm of a bell crank lever 19 which is pivoted in bearings 20 carried by the bottom of the vehicle body 4 and passes through a slot 21 therein and lies closely adjacent the bottom except when raised, as will be hereinafter described. The end of the bell crank lever lying adjacent the bottom of the body is provided with a concavo-convexed manipulating portion 22 and a hooked end 23 which is adapted to be engaged by a crank 24 journaled in bearings 25 secured to the upper side of the bottom and operated by an integral foot pedal 26. The concavo-convexed manipulating portion 22 extends longitudinally of and in spaced relation with a portion of the bottom of the vehicle whereby defining between the underneath wall of said manipulating portion and the bottom of the vehicle a shoe receiving space 22' whereby when the crank lever is actuated by one foot for releasing the crank from the hooked end 23, the other foot of the driver may be employed for actuating the bell crank lever for operating the bolt releasing means. It is to be noted that the horizontal pivot of the coupling 18 prevent the movement of the body 4 from, imparting any movement whatever to the portion 22 of the lever 19, and to the crank 24 and that the vertical pivot of the coupling 18 permits the turning of the axle 1 without throwing any strain on the link 17 and lever 19. It is also to be noted that owing to the levers 19 and 24, it only requires the application of slight power to effect the withdrawal of the bolts 9, and that the location of the lever 24 is such that the driver will not have to leave his seat or release the reins in order to detach the shaft from the vehicle.

By depressing the raised or curved end 22 of the bell crank lever and depressing the foot pedal the crank may be disengaged from the bell crank lever and, by raising its curved end, the links 17 and 16 will be drawn rearwardly and the arms of the bell crank levers will withdraw the bolts 9 from their connection with the bifurcated lugs 7 and thus release the thills.

Having thus described the invention, what I claim as new is:—

In a device of the class described, the combination of a vehicle, of a bolt releasing means, and means for effecting the operation of the said bolt releasing means, said last named means comprising a bell crank lever pivotally connected with the bottom of the vehicle, said bell crank lever consisting of a depending arm and a horizontally disposed arm, the free end of the depending arm being connected with the bolt releasing means, the horizontal arm extending within and rearwardly of the vehicle, the free end of said horizontal arm being formed with a concavo-convexed manipulating portion and a hook, a crank journaled to the bottom of the vehicle in rear of the terminal of the hook and adapted for engagement with the latter for locking the bolt releasing means in inactive position, a foot pedal formed on one of the terminal ends of said crank for releasing the same from the hook, the said concavo convexed manipulating portion extending longitudinally of and in spaced relation with the bottom of the vehicle and in a direction toward the rear end thereof, defining between the bottom of the vehicle and the underneath surface of the hook a shoe receiving space.

In testimony whereof I affix my signature in presence of two witnesses.

CHARLES B. SMITH.

Witnesses:
JAMES A. SMITH,
E. C. HUNYSTA.

Copies of this patent may be obtained for five cents each, by addressing the "Commissioner of Patents, Washington, D. C."